C. N. JONES.
Hand-Seeder.
No. 40,107. Patented Sept. 29, 1863.
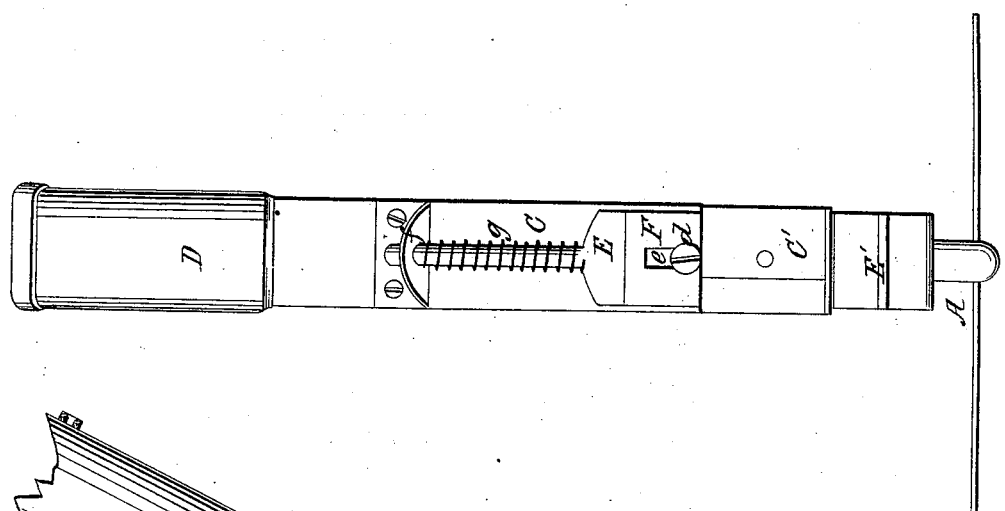
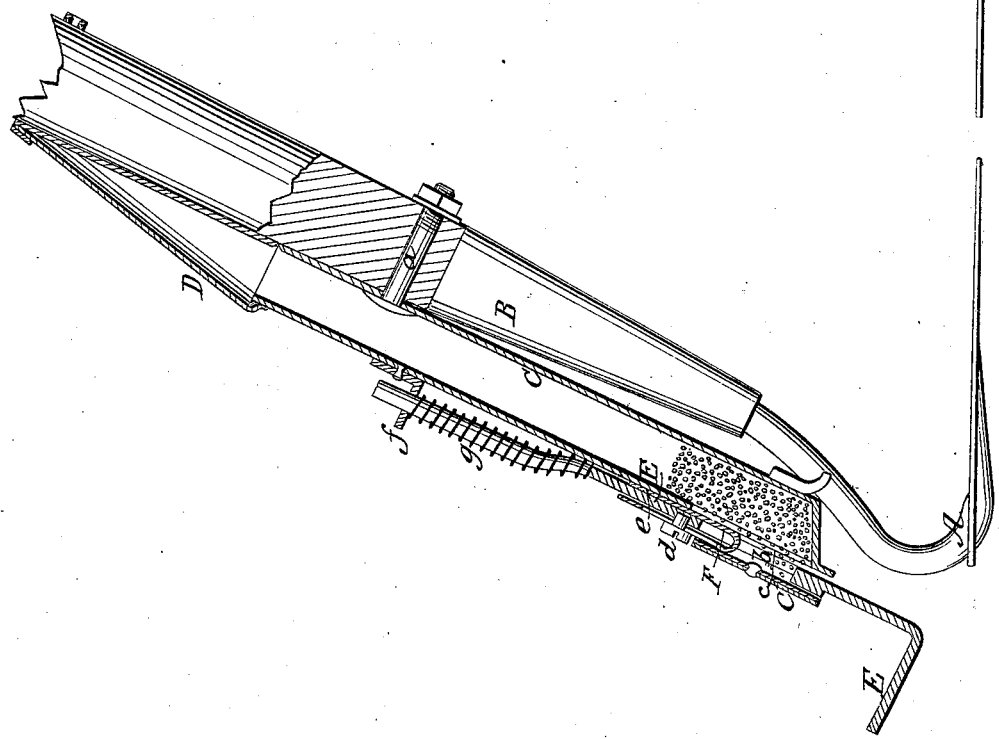

UNITED STATES PATENT OFFICE.

CHARLES N. JONES, OF GALWAY, NEW YORK.

IMPROVEMENT IN PLANTING-HOES.

Specification forming part of Letters Patent No. 40,107, dated September 29, 1863.

*To all whom it may concern:*

Be it known that I, CHARLES N. JONES, of Galway, in the county of Saratoga and State of New York, have invented a new and Improved Corn-Dropper; and I do hereby declare that the following is a full, clear, and exact description of the same, reference being had to the accompanying drawings, forming a part of this specification, in which—

Figure 1 represents a longitudinal vertical section of my invention. Fig. 2 is a front elevation of the same.

Similar letters of reference in both views indicate corresponding parts.

The object of this invention is an attachment to an ordinary hoe, whereby corn or other seed can be dropped simply by pushing the hoe down on the ground, and the time usually lost in counting the kernels can be saved.

The nature of this invention will be readily understood from the following description:

A represents a hoe of the ordinary shape and construction, and secured in the usual manner to the handle B.

C is an oblong four-sided box, of sheet-iron or any other suitable material, which is secured to the handle B of the hoe by means of a screw-bolt, $a$, or in any other suitable manner. The upper end of the box C connects with a bag or pipe, D, of leather or other suitable material, to afford room for a pretty large quantity of corn or other seed. The lower end of the box C forms a guide and cap, C′, for the seed-slide E, which consists of a strip of iron or other suitable material, provided with an opening or seed-cell, $b$, to which seed is admitted from the interior of the box through an opening, $c$. The seed-cell $b$ in the slide E is adjustable by a gage-plate, F, which is secured to said slide by a screw, $d$, passing through a slot, $e$, as clearly shown in Fig. 2 of the drawings. The upper end of the seed-slide is rounded, and it passes through a bracket, $f$, secured to the box C, and a spiral spring, $g$, which encircles the stem of the seed-slide, has a tendency to keep said slide down in such a position that the seed-cell is covered by the cap C′, and the discharge of seed is prevented. The lower end of the seed-slide is bent out at right angles, so as to form a foot, E′, as clearly shown in Fig. 1 of the drawings.

If it is desired to discharge some of the seed contained in the box C, this hoe is pressed down to the ground, with the foot E′ foremost. By this action the slide is forced up, causing the seed-cell to rise above the cap C′, and the seed contained in the same is discharged.

The principal advantages of this improvement are as follows: There is no time spent in dropping and counting from the hand, none in repeatedly turning the hand to and from the pocket, none by letting go of and raising again the handle of the hoe. The laborer has both hands constantly at liberty, and while my invention does away with these several motions it adds none in their place, for it is customary to place the hoe in the hill and press it down or draw it out before dropping. It allows the kernels to scatter, as from the hand, and does not confine them in a row or close contact. My corn-dropper can be used equally well in hard and easy planting, or when any kind of compost or substance is put in the hill. Further, it is cheap, simple, not liable to get out of order, and can be made so light that a child can operate it with great dexterity.

What I claim as new, and desire to secure by Letters Patent, is—

The arrangement of the foot E′ at the lower end of the seed-slide E when the latter works in a box, C, secured to the handle of a hoe, A, in the manner and for the purpose shown and described.

CHARLES N. JONES.

Witnesses:
NELSON J. JONES,
LORENZO D. STEBBINS.